United States Patent
Peeler et al.

(10) Patent No.: US 12,076,643 B2
(45) Date of Patent: Sep. 3, 2024

(54) SYSTEM AND METHOD FOR ENHANCING GAME PERFORMANCE BASED ON KEY ACOUSTIC EVENT PROFILES

(71) Applicant: Dell Products L.P., Round Rock, TX (US)

(72) Inventors: Douglas J. Peeler, Austin, TX (US); Mitchell A. Markow, Hutto, TX (US)

(73) Assignee: Dell Products L.P., Round Rock, TX (US)

( * ) Notice: Subject to any disclaimer, the term of this patent is extended or adjusted under 35 U.S.C. 154(b) by 359 days.

(21) Appl. No.: 17/379,567

(22) Filed: Jul. 19, 2021

(65) Prior Publication Data
US 2023/0015199 A1      Jan. 19, 2023

(51) Int. Cl.
*A63F 13/54* (2014.01)
*A63F 13/86* (2014.01)
*G10K 11/36* (2006.01)

(52) U.S. Cl.
CPC .............. *A63F 13/54* (2014.09); *A63F 13/86* (2014.09); *G10K 11/36* (2013.01)

(58) Field of Classification Search
None
See application file for complete search history.

(56) References Cited

U.S. PATENT DOCUMENTS

| | | | |
|---|---|---|---|
| 2011/0075851 A1* | 3/2011 | LeBoeuf | G10L 25/51 381/56 |
| 2015/0119130 A1* | 4/2015 | Lovitt | A63F 13/847 463/23 |
| 2015/0137998 A1* | 5/2015 | Marti | G10K 15/02 340/901 |
| 2017/0372697 A1* | 12/2017 | Cheatham, III | H04L 65/403 |
| 2019/0270014 A1* | 9/2019 | Chou | G06F 3/016 |
| 2021/0086089 A1* | 3/2021 | Pardeshi | G06N 3/02 |

OTHER PUBLICATIONS

Jason Brownlee, Classification and Regression Trees for Machine Learning, https://machinelearningmastery.com/classification-and-regression-trees-for-machine-learning/ (last accessed Feb. 7, 2024) (Aug. 15, 2020) ("Brownlee") (Year: 2020).*

* cited by examiner

*Primary Examiner* — Walter F Briney, III
(74) *Attorney, Agent, or Firm* — Terrile, Cannatti & Chambers, LLP; Emmanuel A. Rivera

(57) ABSTRACT

A system, method, and computer-readable medium are disclosed for improved threat sensitivity in a gaming application. As audio streams are received during a gaming scenario, a threat profile is selected that best matches the audio streams. The threat profile is a machine language cluster of noise used to adjust speaker equalization profile to emphasize threat noises. Digital signal processing (DSP) coefficients of the speaker equalization profile are adjusted as the gaming application continues.

20 Claims, 6 Drawing Sheets

SYSTEM AND METHOD FOR ENHANCING GAME PERFORMANCE BASED ON KEY ACOUSTIC EVENT PROFILES

BACKGROUND OF THE INVENTION

Field of the Invention

The present invention relates to the management of information handling systems. More specifically, embodiments of the invention provide a system, method, and computer-readable medium for enhancing sound/audio threat sensitivity in gaming scenarios.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Video games which can run on information handling system, provide a complex set of sound events to provide an immersive experience that is matched to video content. However, certain sound frequencies and sound events can mask the ability of a gamer to accurately detect threats (e.g., other player threats). The inability to detect such threats can reduce the gamer's response time. Gamers, for example in "first person shooter" type games, may manually adjust sound equalization to remove some distracting sound events; however, such manually adjusting can reduce all sound events, and not just distracting sound events.

SUMMARY OF THE INVENTION

A system, method, and computer-readable medium are disclosed for enhancing sound threat sensitivity in a gaming application comprising receiving audio streams when the game application is started; selecting a threat profile that best matches the audio streams, wherein the threat profile is a machine learning (ML) cluster; updating digital signal processing (DSP) coefficients of a speaker equalization profile based on the threat profile and incoming audio streams; and continuously adjusting the DSP coefficients and speaker equalization profile as the gaming application continues.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A system, method, and computer-readable medium are disclosed for identifying, emphasizing and enhancing audio or sounds that can be threats to a user/gamer during gaming to improve response time of the user/gamer to those threats.

Certain implementations can provide for characterizing common sound events and apply Machine Learning identification techniques. As to threat sensitivity of sound events, when threatening sound events are close and/or approaching, sound processing can be used to increase sensitivity of the threat by enhancing the characteristic of the threat. Sound event level detection can be applied to ascertain threat level. Graded response can be defined. Threat level options can be presented audibly or visually.

Implementations can provide for removing low frequency masking sounds; raising sound pressure level (SPL) of identified sound events streams and/or spectral response of identified sound effects; adding chorus/harmonics to boost the 3 kHz range (i.e., range for human hearing) for augmenting equal loudness contours (i.e., harmonic synthesis); different equalization (EQ) for rear channels and/or off-axis sounds (e.g., using multi-channel source mapping to determine EQ, applying head related transfer function (HRTF); applying multi-band dynamic range compression to auto level spectral areas of focus; providing human hearing response from sound sources behind the user/gamer (e.g., adjusting channels); and using machine learning if the user/gamer has been defeated by specific sound events and apply different threat level and alert mechanism based on those negative experiences For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, gaming, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a microphone, keyboard, a video display, a mouse, etc. The information handling system may also include one or more buses operable to transmit communications between the various hardware components.

Figure 1:
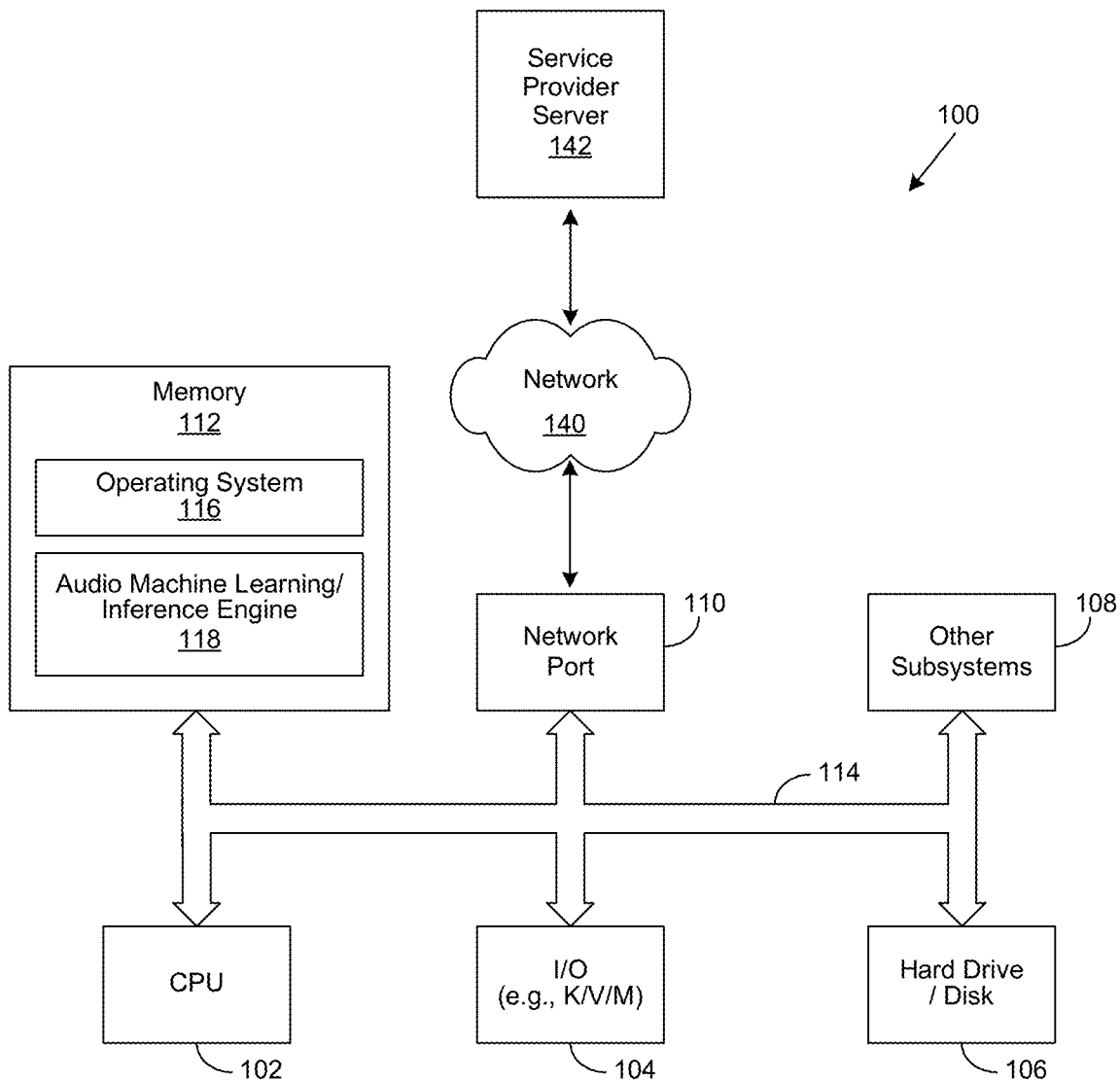
FIG. 1 is a general illustration of components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a microphone, a keyboard, a video/display, a mouse, and associated controllers (e.g., K/V/M), a hard drive or disk storage 106, and various other subsystems 108. In various embodiments, the information handling system 100 also includes network port 110 operable to connect to a network 140, where network 140 can include one or more wired and wireless networks, including the Internet. Network 140 is likewise accessible by a service provider server 142. The information handling system 100 likewise includes system memory 112, which is interconnected to the foregoing via one or more buses 114. System memory 112 further comprises operating system (OS) 116 and in various embodiments includes an audio machine learning/inference engine 118 as further described herein. In certain embodiments. In certain implementations, the audio machine learning/inference engine 118 is provided as a service from the service provider server 142.

Figure 2:
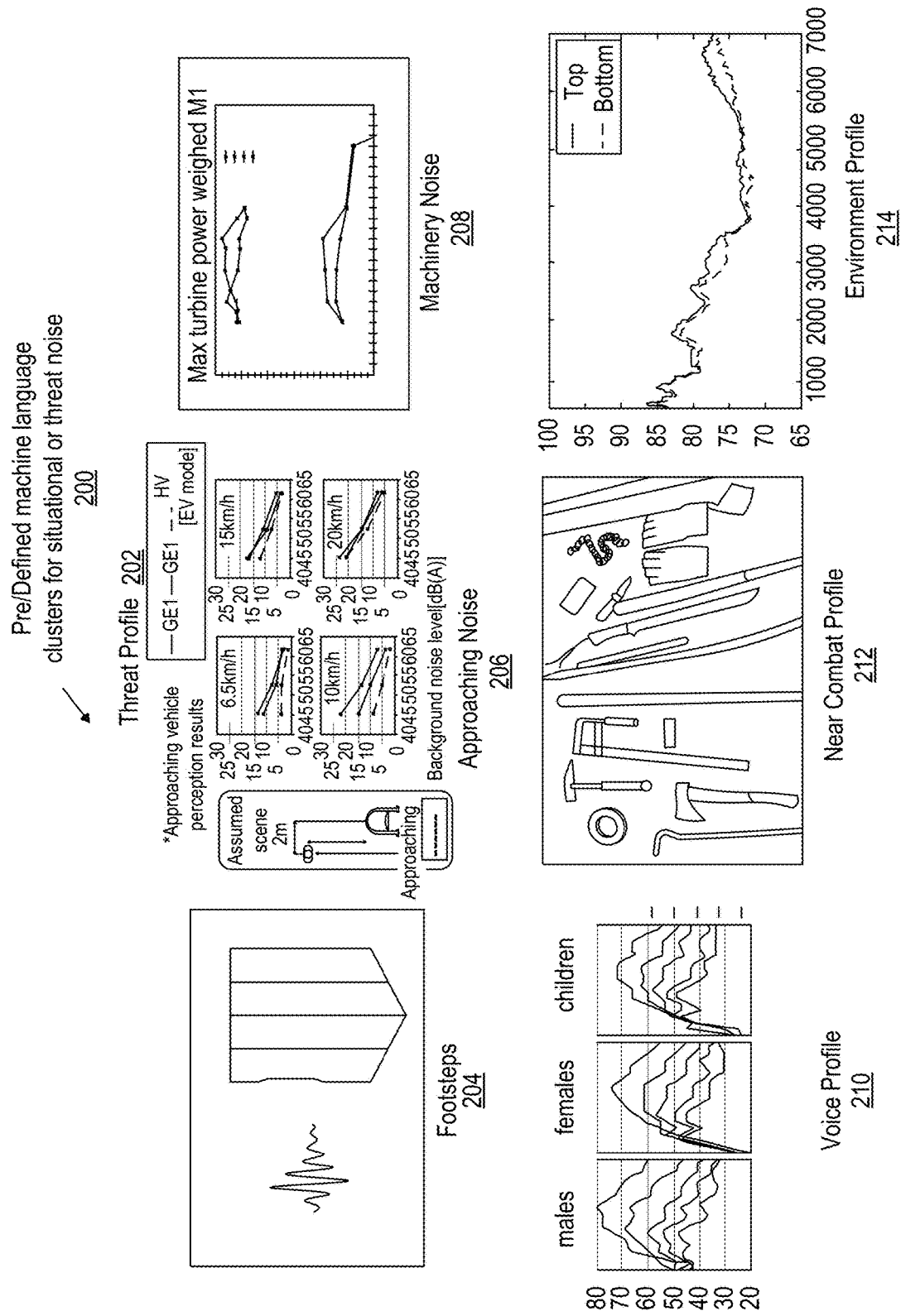
FIG. 2 is an example of a pre/defined machine language cluster for situational or threat noise.

FIG. 2 shows an example of a pre/defined machine language cluster for situational or threat noise. Machine language (ML) cluster 200 is one of various pre/defined Machine Language clusters for situational or threat noise 200 that can be used for deep learning by audio machine learning/inference engine 118 to address a set of situational or threat noises. As further described herein, sound/audio equalization can be adjusted based on such situational or threat noises. In certain implementations, recursive learning is performed, which is based on a baseline ML cluster 200. For example, during a gaming situation, multiple players may be involved in a game, and profiles of situational or threat noises can change over the course of the game.

A threat profile 200 can include multiple noise or threat profiles, such as a footsteps profile 204, approaching noise profile 206, machinery noise profile 208, voice profile(s) 210, near combat profile 212, environment profile 214, etc. Each of the profiles 204 to 214 are representative of different sounds that are present in the game situation.

In certain implementations, ML clusters 200 are received from an external database or storage from the information handling system 100. Implementations can also provide that ML clusters 200 are stored in hard drive/disk 106 of information handling system 100 as shown in FIG. 1. Implementations can provide for threat profile 202 and other threat profiles to be intermediately stored in and accessed from hard drive/disk 106.

Figure 3:
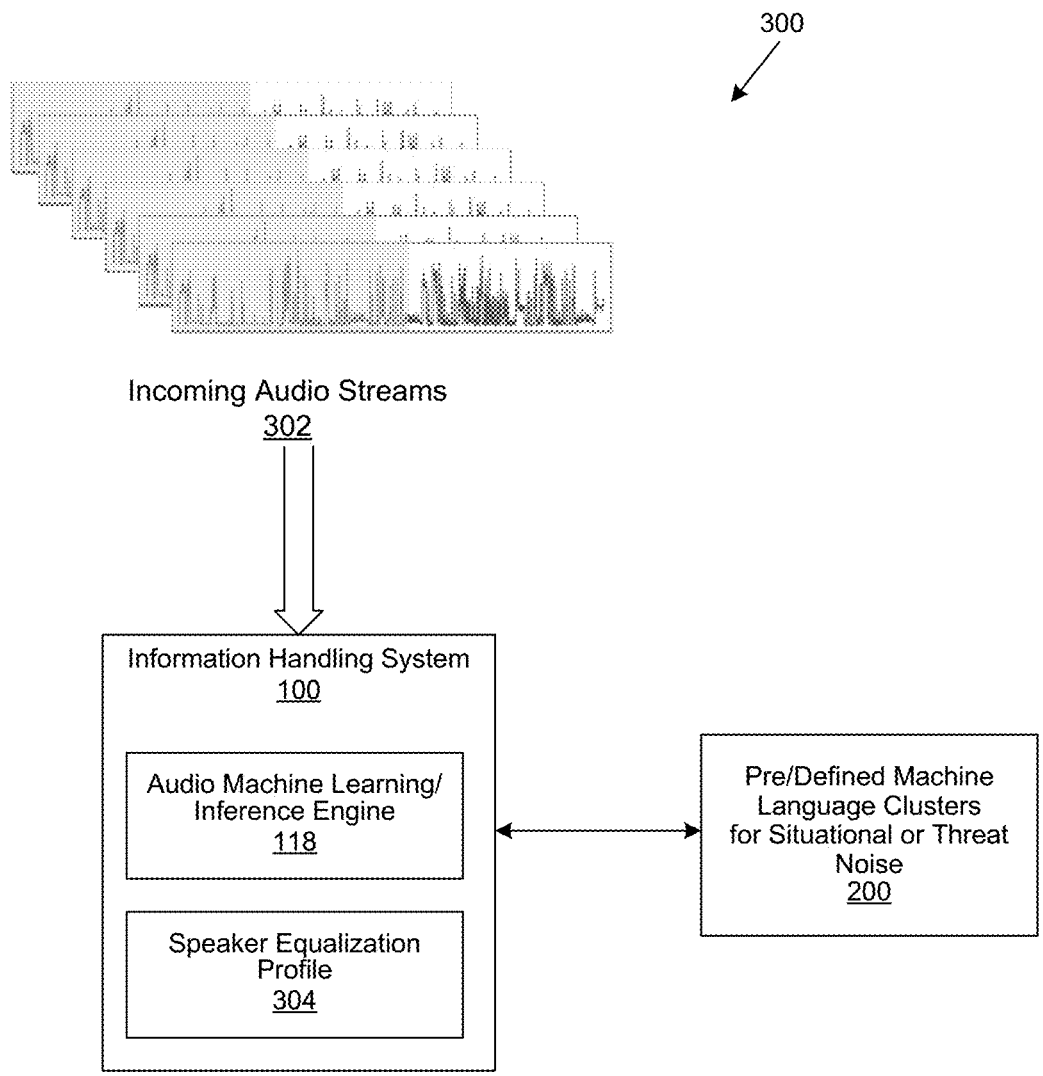
FIG. 3 is a generalized system for updating speaker equalization profiles.

FIG. 3 shows a system for updating speaker equalization profiles. The system 300 implements information handling system 100. Incoming audio streams 302 are received by the information handling system 100. Such audio streams 302 can be received from various sources, such as input/output (I/O) devices 104 as described in FIG. 1. The audio streams 302 can be processed from gaming applications implemented by information handling system 100.

In particular, implementations provide for the audio machine learning/inference engine 118 to select a ML clusters from pre/defined machine language (ML) clusters for situational or threat noise 200. In certain implementations, the audio machine learning/inference engine 118 characterizes and cluster key threat acoustic events through supervised classification and regression modeling such as Random Forest.

For example, during a gaming situation an algorithm implemented on audio machine learning/inference engine 118 performs supervised classification and regression modeling inferencing to classify key events to a given ML cluster. Classification can allow audio signal processing to be deployed, such that the threats are acoustically emphasized more clearly to the end user. Certain implementations provide for supervised model per game application or a generalized model for all game applications through an audio engine, as described in FIG. 4. Supervised learning can modify ML clusters based on success or failure of a gamer as to specific acoustic events.

Based on the ML cluster chosen by the audio machine learning/inference engine 118, a speaker (audio output) equalization profile 304 is updated. The speaker (audio output) equalization profile 304 is used to adjust the audio output, such as a device (e.g., speaker(s), headset, etc.) of input/output (I/O) devices 104 described in FIG. 1. The audio output being adjusted to highlight or emphasis threat noises during game play. In various implementations, adjusting the equalization profile 304 is used to mask low frequency sounds, raise sound pressure level (SPL) of identified sound events streams and/or spectral response of identified sound effects, add chorus/harmonics to boost the 3 kHz range (range for human hearing) for augmenting equal loudness contours (i.e., harmonic synthesis), provide different equalization for rear channels and/or off-axis sounds (e.g., using multi-channel source mapping to determine EQ) applying head related transfer function (HRTF); apply multi-band dynamic range compression to auto level spectral areas of focus, and provide human hearing response from sound sources behind the user/gamer (e.g., adjusting channels).

Incoming audio streams 304 are continuously received and processed. by the audio machine learning/inference engine 118. Adjustment or changes to the speaker equalization profile 304 are performed by the audio machine learning/inference engine 118 as to the incoming audio streams 304 and the selected ML cluster. Implementations can provide for the equalization profile 304 to be periodically updated, for example every 100 milliseconds to 1 second during game play.

Figure 4:
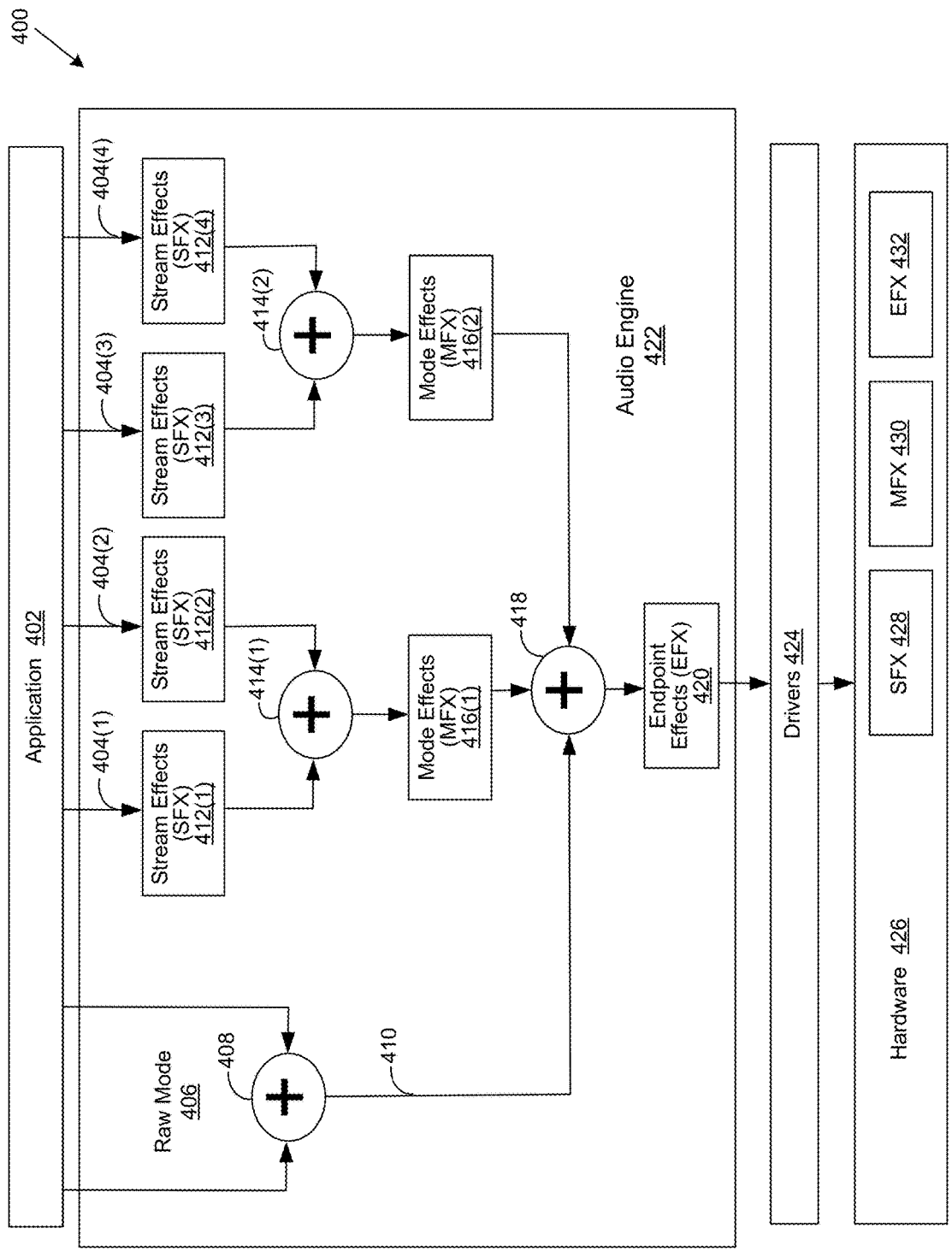
FIG. 4 is an example audio processing object architecture.

FIG. 4 shows an example audio processing object architecture. In particular, the architecture 400 provides for audio processing objects or APOs. Architecture 400 can be included in information handling system 100. APOs can provide customizable software based digital signal processing for Microsoft Windows® audio streams. Examples of APOs can include graphic equalizers, acoustic echo cancellation (AEC), automatic gain control (AGC), etc.

An application (e.g., gaming application) 402 determines how many audio streams to send out, or number of audio channels (e.g., two channel, 5.1, 7.1, etc.) In this example, there is audio stream 1 404(1), audio stream 2 404(2), audio stream 3 404(3) and audio stream 4 404(4).

In this example, raw mode 406 is provided, where raw mode 406 can be used for comparison of audio streams (e.g., implementations in Microsoft Windows® operating system operations). Audio streams are received and mixed/rendered at mixer 408, with an output 410. Stream effects or SFX as described herein are not used for raw streams/raw mode.

An SFX APO has an instance of the effect for audio streams 404, where stream effects (SFX) 412(1) receives audio stream 404(1), stream effects (SFX) 412(2) receives audio stream 404(2), stream (SFX) 412(3) receives audio stream 404(3), and stream (SFX) 412(4) receives audio stream 404(4). Stream effects (SFX) are before a mixer/ renderer or after audio stream 404 capture for a given mode and can be used for changing channel count before a mixer/renderer. In this example, SFX 412(1) and SFX 412(2) provide input to mixer/renderer 414(1). SFX 412(3) and SFX 412(4) provide input to mixer/renderer 414(2).

Mode effects (MFX) are applied to all streams that are mapped to the same mode. Mode effects (MFX) are applied after a mixer/renderer or before capture for a given mode, but before a mixer/renderer or after capture of all given modes. In this example, mode effects (MFX) 416(1) receives the output of mixer/renderer 414(1) and provides an input to mixer/renderer 418. Mode effects MFX) 416(2) receives the output of mixer/renderer 414(2) and provides an input to mixer/renderer 418.

An endpoint effect(s) (EFX) can be applied to all streams that use the same endpoint. An endpoint effect(s) (EFX) can be applied to all streams, including raw streams. In this example, endpoint effects (EFX) 420 receives the output of mixer/renderer 418. In various implementations, an audio engine 422 performs the processes described as to stream effects (EFX), mode effects (MFX) and endpoint effects (EFX).

Drivers 424 can define audio modes, where audio categories as selected by application 402. The audio categories can be mapped to the audio modes. Applications, such as application 402, can tag audio streams with one of various (e.g., 10) audio categories. Therefore, applications have the option to tag an audio stream with a specific audio stream category. Examples of audio stream categories for gaming can include game chat (in game communication between games/users), game media (in game music, game effects (e.g., balls bouncing, car engine sounds, bullets, etc.), etc. Hardware 426 can include the defined SFX 428, MFX 430, and EFX 432.

In various implementations, the audio machine learning/inference engine 118 checks for the audio stream category to focus ML cluster analysis. For example, audio stream 404(4) enters stream effects (SFX) 412(4). A tag is provided by application 402 as to audio stream category of "game effects". The audio machine learning/inference engine 118 performs an analysis as to "footsteps" and adds "footsteps" to the equalization/dynamic enhancement, such as modifying the speaker equalization profile 304.

Figure 5:
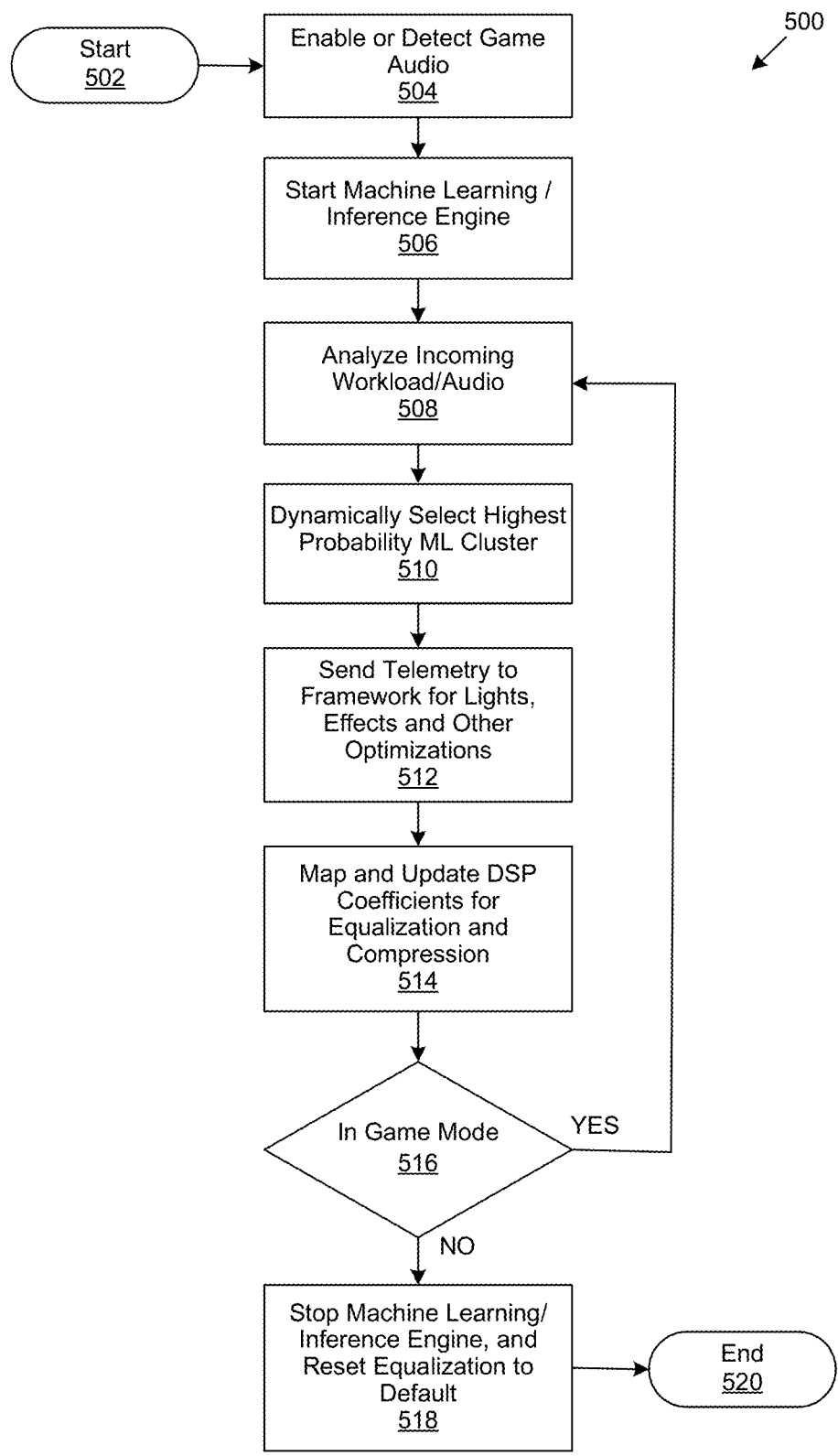
FIG. 5 is generalized flowchart for dynamic threat machine language cluster determination.

FIG. 5 is a generalized flowchart 500 for dynamic threat machine language (ML) cluster determination. The order in which the method is described is not intended to be construed as a limitation, and any number of the described method blocks may be combined in any order to implement the method, or alternate method.

At step 502, the process 500 starts. At step 504, enabling or detecting game audio is performed. The step 504 can be performed when through user/gamer selection, Microsoft Windows® OS audio categories, title look up, etc.

At step 506, the audio machine learning/inference engine 118 is started. In particular, the audio machine learning/inference engine 118 is implemented for audio processing objects or APOs.

At step 508, incoming audio streams or a workload is received by the information handling system 100. At step 510, the audio machine learning/inference engine 118 dynamically selects a highest probably ML cluster as described in FIG. 3.

At step 512, telemetry is sent to a framework for other applications to apply lights, effects, and other optimization, based on the received workload/audio streams and selected ML cluster. In certain implementations, during gaming threat level options can be presented audibly or visually.

At step 514, digital signal processing (DSP) coefficients are mapped and updated for equalization and compression.

A determination is performed at step 516 as to whether game mode is still in operation. If game mode is still in operation, following the YES branch of step 516, then process 500 goes back to step 506. Else if game mode is not in operation, following the NO branch of step 516, at step 518, the audio machine learning/inference engine 118 is stopped and equalization is reset to default. At step 520, the process 500 ends.

Figure 6:
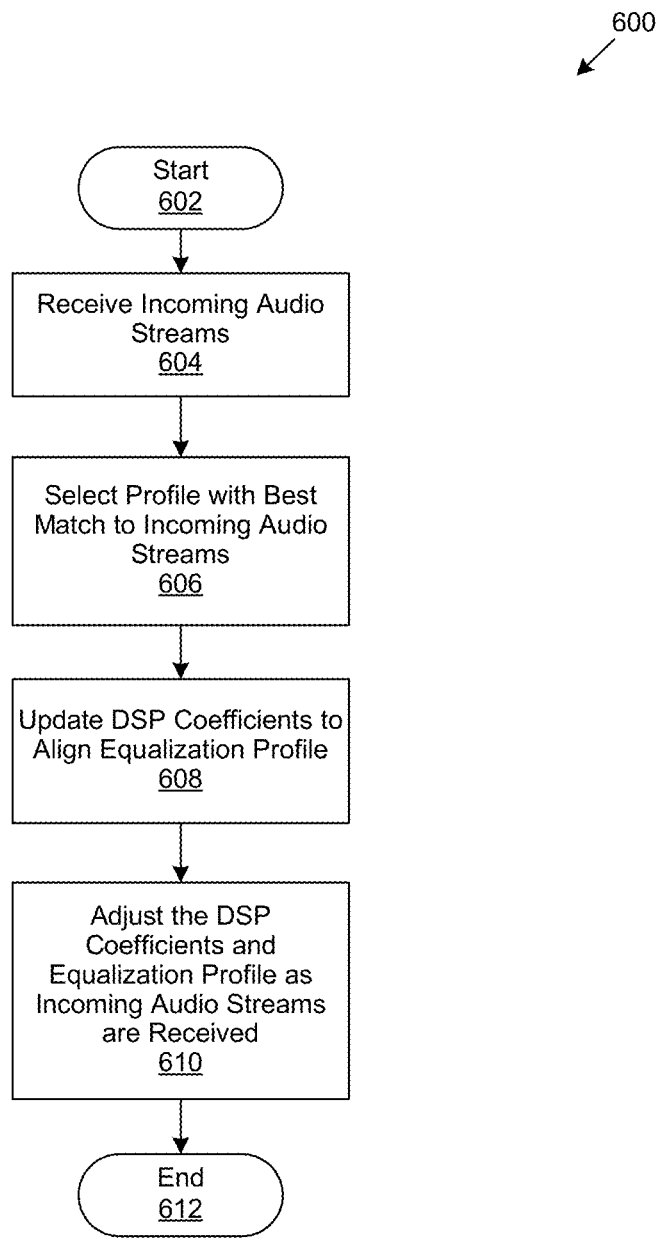
FIG. 6 is a generalized flowchart for enhancing sound/audio threat sensitivity in a gaming application.

FIG. 6 is a generalized flowchart 600 for enhancing sound/audio threat sensitivity in a gaming application. The order in which the method is described is not intended to be construed as a limitation, and any number of the described method blocks may be combined in any order to implement the method, or alternate method.

At step 602, the process 600 starts. At step 604, audio streams are received. As discussed, the audio streams can be received when a game application runs on information handling system 100. The audio streams include various audio or sounds, including threats.

At step 606, a threat profile is selected that best matches the received audio streams. Implementations provide for the audio machine learning/inference engine 118 to perform the selecting. The threat profile can be a machine learning (ML) cluster as described in FIG. 2.

At step 608, digital signal processing (DSP) coefficients are updated for an audio output or speaker equalization profile. The audio machine learning/inference engine 118 can perform the update of the speaker equalization profile based on the threat profile or ML cluster as to particular threat noises that are determined as to the received audio streams.

At step 610, a continuous adjusting of the DSP coefficients and speaker equalization profile is performed as the game continues. At step 612, the process 600 ends.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only and are not exhaustive of the scope of the invention.

Consequently, the invention is intended to be limited only by the spirit and scope of the appended claims, giving full cognizance to equivalents in all respects.

What is claimed is:

1. A computer-implementable method for enhancing sound threat sensitivity in a gaming application comprising:
    receiving audio streams when the game application is started;
    selecting a threat profile that best matches the audio streams, wherein the threat profile is a machine learning (ML) cluster;
    selecting an ML cluster through supervised classification and regression modeling, wherein the ML cluster is based on a game profile;
    updating digital signal processing (DSP) coefficients of a speaker equalization profile based on the threat profile and incoming audio streams, wherein the speaker equalization profile is used to mask low frequency sounds, raise sound pressure level of identified sound events streams and/or spectral response of identified sound effects, add chorus/harmonics to boost 3 kHz range for human hearing for augmenting equal loudness contours, provide different equalization for rear channels and/or off-axis sounds for applying head related transfer function, apply multi-band dynamic range compression to auto level spectral areas of focus, and provide human hearing response from sound sources behind a user; and
    continuously adjusting the DSP coefficients and speaker equalization profile as the gaming application continues.

2. The method of claim 1, wherein the gaming application determines the number of audio streams and tags each audio stream with a category used for machine cluster analysis.

3. The method of claim 1, wherein the machine learning cluster is used for supervised classification and regression modeling.

4. The method of claim 1, further comprising performing supervised modeling to modify the ML cluster based on success or failure of a user during a gaming scenario.

5. The method of claim 1, wherein the gaming application determines the number of channels of the audio streams and the speaker equalization profile is adjusted per the channels.

6. The method of claim 1 further comprising providing telemetry information for the other applications to apply lights, effects, and other optimization, based on received audio streams and selected ML cluster.

7. The method of claim 1, further comprising applying stream effects, mode effects and endpoint effects to the audio streams.

8. A system comprising:
    a processor;
    a data bus coupled to the processor; and
    a non-transitory, computer-readable storage medium embodying computer program code, the non-transitory, computer-readable storage medium being coupled to the data bus, the computer program code interacting with a plurality of computer operations for enhancing sound threat sensitivity in a gaming application and comprising instructions executable by the processor and configured for:
    receiving audio streams when the game application is started;
    selecting a threat profile that best matches the audio streams, wherein the threat profile is a machine learning (ML) cluster;
    selecting an ML cluster through supervised classification and regression modeling, wherein the ML cluster is based on a game profile;
    updating digital signal processing (DSP) coefficients of a speaker equalization profile based on the threat profile and incoming audio streams, wherein the speaker equalization profile is used to mask low frequency sounds, raise sound pressure level of identified sound events streams and/or spectral response of identified sound effects, add chorus/harmonics to boost 3 kHz range for human hearing for augmenting equal loudness contours, provide different equalization for rear channels and/or off-axis sounds for applying head related transfer function, apply multi-band dynamic range compression to auto level spectral areas of focus, and provide human hearing response from sound sources behind a user; and continuously adjusting the DSP coefficients and speaker equalization profile as the gaming application continues.

9. The system of claim 8, wherein the gaming application determines the number of audio streams and tags each audio stream with a category used for machine cluster analysis.

10. The system of claim 8, wherein the machine learning cluster is used for supervised classification and regression modeling.

11. The system of claim 8, further comprising performing supervised modeling to modify the ML cluster based on success or failure of a user during a gaming scenario.

12. The system of claim 8, wherein the gaming application determines the number of channels of the audio streams and the speaker equalization profile is adjusted per the channels.

13. The system of claim 8, further comprising providing telemetry information for other applications to apply lights, effects, and other optimization, based on received audio streams and selected ML cluster.

14. The system of claim 8, further comprising applying stream effects, mode effects and endpoint effects to the audio streams.

15. A non-transitory, computer-readable storage medium embodying computer program code, the computer program code comprising computer executable instructions configured for:

receiving audio streams when the game application is started;

selecting a threat profile that best matches the audio streams, wherein the threat profile is a machine learning (ML) cluster;

selecting an ML cluster through supervised classification and regression modeling, wherein the ML cluster is based on a game profile;

updating digital signal processing (DSP) coefficients of a speaker equalization profile based on the threat profile and incoming audio streams, wherein the speaker equalization profile is used to mask low frequency sounds, raise sound pressure level of identified sound events streams and/or spectral response of identified sound effects, add chorus/harmonics to boost 3 kHz range for human hearing for augmenting equal loudness contours, provide different equalization for rear channels and/or off-axis sounds for applying head related transfer function, apply multi-band dynamic range compression to auto level spectral areas of focus, and provide human hearing response from sound sources behind a user; and continuously adjusting the DSP coefficients and speaker equalization profile as the gaming application continues.

16. The non-transitory, computer-readable storage medium of claim 15, wherein the gaming application determines the number of audio streams and tags each audio stream with a category used for machine cluster analysis.

17. The non-transitory, computer-readable storage medium of claim 15, wherein the machine learning cluster is used for supervised classification and regression modeling.

18. The non-transitory, computer-readable storage medium of claim 15 further comprising performing supervised modeling to modify the ML cluster based on success or failure of a user during a gaming scenario.

19. The non-transitory, computer-readable storage medium of claim 15, wherein the gaming application determines the number of channels of the audio streams and the speaker equalization profile is adjusted per the channels.

20. The non-transitory, computer-readable storage medium of claim 15 further comprising providing telemetry information for other applications to apply lights, effects, and other optimization, based on received audio streams and selected ML cluster.

* * * * *